US012166315B2

(12) United States Patent
Hayashi

(10) Patent No.: US 12,166,315 B2
(45) Date of Patent: Dec. 10, 2024

(54) ELECTRICAL CONNECTOR, ELECTRICAL CONNECTOR ASSEMBLY AND ELECTRONIC DEVICE

(71) Applicant: TYCO ELECTRONICS JAPAN G.K., Kawasaki (JP)

(72) Inventor: Toshiaki Hayashi, Toyota (JP)

(73) Assignee: TYCO ELECTRONICS JAPAN G.K., Kawasaki (JP)

( * ) Notice: Subject to any disclaimer, the term of this patent is extended or adjusted under 35 U.S.C. 154(b) by 409 days.

(21) Appl. No.: 17/574,976

(22) Filed: Jan. 13, 2022

(65) Prior Publication Data

US 2022/0231459 A1 Jul. 21, 2022

(30) Foreign Application Priority Data

Jan. 20, 2021 (JP) ................................ 2021-006863

(51) Int. Cl.
*H01R 13/641* (2006.01)
*H01R 13/46* (2006.01)

(52) U.S. Cl.
CPC ........... *H01R 13/641* (2013.01); *H01R 13/46* (2013.01)

(58) Field of Classification Search
None
See application file for complete search history.

(56) References Cited

U.S. PATENT DOCUMENTS 4,915,643 A * 4/1990 Samejima .......... H01R 13/6272 439/357
10,770,821 B2 * 9/2020 Zheng .................... H01R 13/46

FOREIGN PATENT DOCUMENTS

| | | | |
|---|---|---|---|
| JP | H0513130 A | | 1/1993 |
| JP | 2001006816 A | | 1/2001 |
| JP | 2007324072 A | | 12/2007 |
| JP | 2010165573 A | | 7/2010 |
| JP | 2010218925 | | 9/2010 |
| JP | 2014170707 A | | 9/2014 |
| JP | 2015103421 A | | 6/2015 |
| KR | 20070017359 A | * | 2/2007 |
| KR | 20140025255 A | | 3/2014 |

OTHER PUBLICATIONS

Extended European Search Report for corresponding EP Application No. 22151893.3-1201 dated Jun. 15, 2022.
Communication pursuant at Article 94(3) for corresponding EP Application No. 22151893.9-1201 dated Mar. 20, 2024 (7 pages).

* cited by examiner

*Primary Examiner* — Tho D Ta

(57) ABSTRACT

An electrical connector is provided including a housing retaining a plurality of terminals. The housing is mated with a mating electrical connector along a mating direction. The housing includes a receiving region receiving the mating electrical connector, a sound path adjacent to the receiving region, and a partition wall dividing the receiving region and the sound path from each other. The sound path includes an open end on a first end and a closed end on a second end along the mating direction.

20 Claims, 8 Drawing Sheets

ELECTRICAL CONNECTOR, ELECTRICAL CONNECTOR ASSEMBLY AND ELECTRONIC DEVICE

CROSS REFERENCE TO RELATED APPLICATIONS

This application claims priority to JP Application No. 2021-006863, filed 2021 Jan. 20, the subject matter of which is herein incorporated by reference in its entirety.

BACKGROUND OF THE INVENTION

The subject matter herein relates generally to electrical connectors.

An electrical connector is generally provided with a male connector retaining a male terminal and a female connector configured to mate with the male connector and retaining a female terminal connected electrically to the male terminal. Hereinafter, the electrical connector may be referred to simply as a connector. In order to keep the male connector and the female connector in a mated state and prevent them from unmating from each other, a member called a lock arm is provided, for example to the female connector, and a male-side protrusion engaged with the lock arm is provided to the male connector.

When the male connector and the female connector are mated together, a female-side protrusion provided to the lock arm climbs over the male-side protrusion of the male connector. The lock arm has elasticity, and therefore, when the female-side protrusion climbs over the male-side protrusion and they reach an engaged state, the female-side protrusion hits a predetermined face of a housing of the male connector, so that a hitting sound occurs. This hitting sound can be evidence that the male connector and the female connector have been properly mated together, and is hence also called a mating sound. This is because engaging portions of the male-side protrusion and the female-side protrusion are often difficult to confirm visually from outside the connectors. Therefore, producing a loud hitting sound has been proposed, for example as in Japanese Patent JP2001-006816A (PTL1) and Japanese Patent JP2010-165573A (PTL 2).

PTL 1 proposes forming a void in a region immediately below a wall face on which is formed the male-side protrusion (catching protruding portion) of the male connector. PTL 1 states that when the female-side protrusion (lock claw) of the lock arm climbs over the male-side protrusion and hits the wall face, a mating sound due to the hit echoes through the void, and thereby the mating sound can be made louder.

In PTL 2, a space is provided behind a wall face hit by the lock arm returning from deflection deformation. PTL 2 states that the mating sound can be made louder by making the hitting sound resonate through the space.

Unfortunately, the proposal of PTL 1 has the possibility that the mating sound may be muffled because an opening portion of the space is closed by the female connector at the time of mating. Similarly, the proposal of PTL 2 has the possibility that the sound may be muffled because, when mating the male connector and the female connector together, an operator often performs the task with a finger placed in the vicinity of a lock-arm releasing portion, and an opening portion of the space may be closed by the finger. This may cause the operator to fail to hear the mating sound.

A need remains for an electrical connector that makes it unlikely that an operator who performs the mating task will fail to hear the mating sound.

BRIEF DESCRIPTION OF THE INVENTION

In an embodiment, an electrical connector is provided with a housing retaining a plurality of terminals that is mated with a mating electrical connector along a mating direction. The housing is provided with a receiving region receiving the mating electrical connector, a sound path adjacent to the receiving region, and a partition wall dividing the receiving region and the sound path from each other. Along its mating direction, the sound path (channel) is provided with an opened end on a first end and a closed end on a second end. The partition wall is preferably provided with a hitting region hit by an element of the mating electrical connector according to proper mating with the mating electrical connector, and the sound path includes the hitting region, as viewed from above. The sound channel may have an opening area that increases from the second end toward the first end. In addition, the sound path may be continuous with both sides in a width direction of the receiving region. Further, the sound path may have a horn shape.

In an embodiment, an electrical connector assembly is provided with the electrical connector and a mating electrical connector that are mated together.

In an embodiment, an electronic device is provided with an electrical connector provided with a housing retaining a plurality of terminals that is mated with a mating electrical connector, and an enclosure accommodating the electrical connector with a mating frontage of the electrical connector exposed outside.

By providing the sound path therein, and positioning the opened end thereof outside the enclosure, the mating sound will not be muffled inside the enclosure and can be emitted outside the enclosure. Therefore, it is unlikely that an operator who performs mating of the electrical connectors will fail to hear the mating sound.

In an embodiment, an electrical connector is provided including a housing retaining a plurality of terminals. The housing is mated with a mating electrical connector along a mating direction. The housing includes a receiving region receiving the mating electrical connector, a sound path adjacent to the receiving region, and a partition wall dividing the receiving region and the sound path from each other. The sound path includes an open end on a first end and a closed end on a second end along the mating direction.

In an embodiment, an electrical connector assembly is provided including a mating electrical connector and an electrical connector mutually mated with the mating electrical connector. The electrical connector includes a housing retaining a plurality of terminals, the housing including a receiving region receiving the mating electrical connector, a sound path adjacent to the receiving region, and a partition wall dividing the receiving region and the sound path from each other. The sound path includes an open end on a first end and a closed end on a second end along the mating direction.

In an embodiment, an electronic device is provided including an electrical connector including a housing retaining a plurality of terminals. The housing is mated with a mating electrical connector. The housing includes a receiving region receiving the mating electrical connector, a sound path adjacent to the receiving region, and a partition wall dividing the receiving region and the sound path from each other. The sound path includes an open end on a first end and a closed end on a second end along the mating direction. The electronic device includes an enclosure accommodating the electrical connector with a mating frontage of the electrical connector exposed outside. The open end is exposed outside together with the mating frontage.

BRIEF DESCRIPTION OF THE DRAWINGS

FIG. 1(*b*) is an isometric view showing a male connector constituting one element of the electrical connector assembly.

FIG. 2(*b*) is a cross sectional view of the first connector in accordance with an exemplary embodiment taken along a line IIb-IIb in the direction of arrows as shown in FIG. 3(*c*).

FIG. 3(*b*) is a bottom view of the first connector in accordance with an exemplary embodiment.

FIG. 3(*c*) is a front view of the first connector in accordance with an exemplary embodiment.

FIG. 4(*b*) is a cross sectional view of a portion of the second connector in accordance with an exemplary embodiment corresponding to FIG. 2(*b*).

FIG. 5(*b*) is a side view of the electrical connector assembly in accordance with an exemplary embodiment at a second stage of mating.

FIG. 5(*c*) is a side view of the electrical connector assembly in accordance with an exemplary embodiment at a third stage of mating.

FIG. 6(*b*) is a cross sectional view of the electrical connector assembly in accordance with an exemplary embodiment at a second stage of mating.

FIG. 6(*c*) is a cross sectional view of the electrical connector assembly in accordance with an exemplary embodiment at a third stage of mating.

FIG. 7(*b*) is a diagram showing a modification of a sound path of the first connector in accordance with an exemplary embodiment, as viewed from above.

FIG. 7(*c*) is a diagram showing a modification of a sound path of the first connector in accordance with an exemplary embodiment, as viewed from above.

DETAILED DESCRIPTION OF THE INVENTION

Figure 1A:
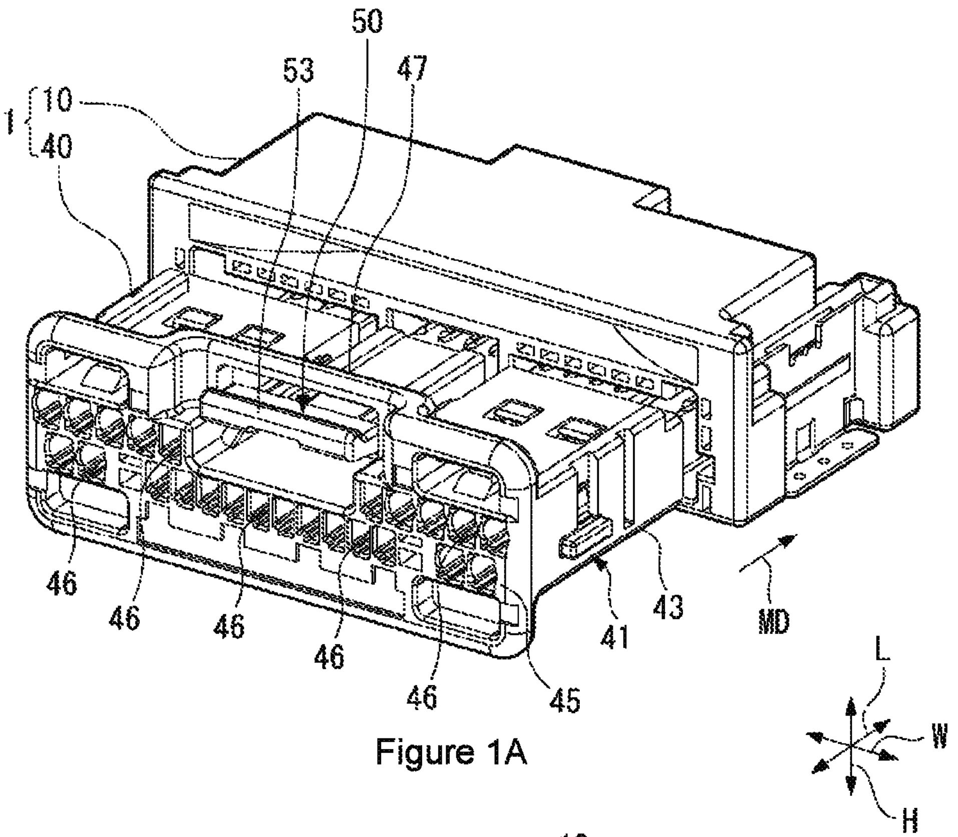
FIG. 1(*a*) is an isometric view of an electrical connector assembly in accordance with an exemplary embodiment.
Figure 1B:
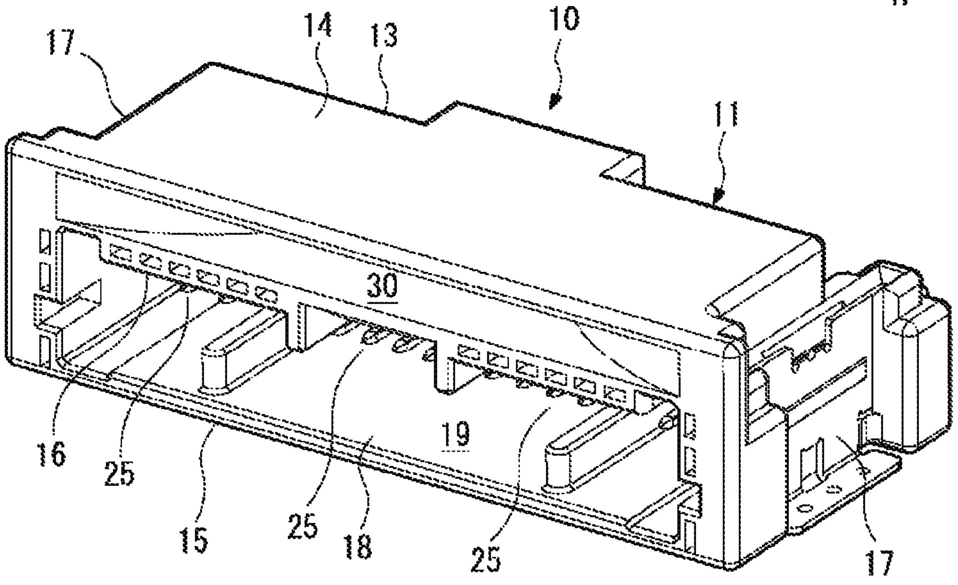

FIG. 1(*a*) is an isometric view of an electrical connector assembly 1 in accordance with an exemplary embodiment including a first electrical connector 10 and a second electrical connector 40 mated with the first electrical connector 10. FIG. 1(*b*) is an isometric view showing a male connector constituting the first electrical connector 10 of the electrical connector assembly 1.

The electrical connector assembly 1 is provided with a first electrical connector 10 and a second electrical connector 40 mated with the first electrical connector 10, as shown in FIG. 1(*a*). In the present embodiment, the first electrical connector 10 is equivalent to a male connector retaining a plurality of male first terminals 25, whereas the second electrical connector 40 is equivalent to a female connector retaining female second terminals connected electrically to the first terminals 25.

It should be noted that in the electrical connector assembly 1, the first electrical connector 10, and the second electrical connector 40, a width direction W, a height direction H, and a longitudinal direction L are defined as shown in FIGS. 1(*a*), 1(*b*) and other figures. In addition, a mating direction MD of the first electrical connector 10 and the second electrical connector 40 is defined as shown in FIG. 1(*a*). In addition, in the first electrical connector 10 and the second electrical connector 40, their respective mating sides are defined as front, and the opposite sides as rear. In addition, the first electrical connector 10 corresponds to an electrical connector and the second electrical connector 40 corresponds to a mating electrical connector.

Figure 6A:
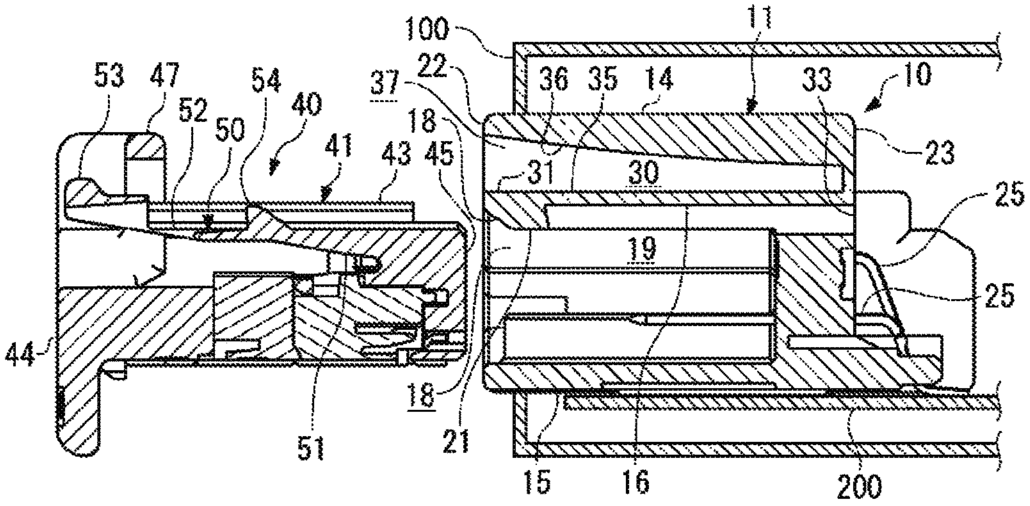
FIG. 6(*a*) is a cross sectional view of the electrical connector assembly in accordance with an exemplary embodiment at a first stage of mating.
Figure 6B:
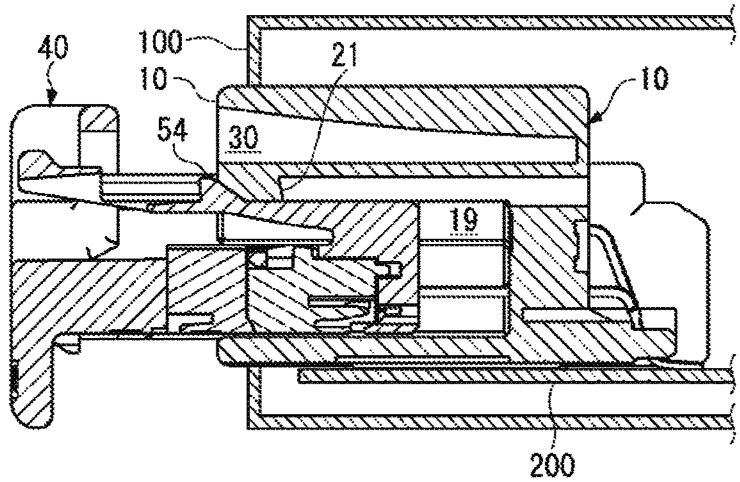
Figure 6C:
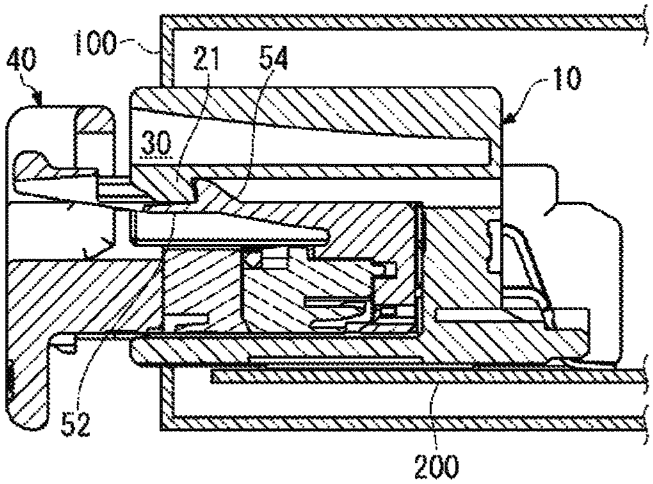

The electrical connector assembly 1 is accommodated in an enclosure 100 of an electronic device, excluding a portion of the front of the first electrical connector 10, as shown by way of example in FIGS. 6(*a*), 6(*b*), 6(*c*). Therefore, when a mating sound due to hitting by a lock arm 50 accompanying proper mating with the second electrical connector 40 occurs in the first electrical connector 10, if this mating sound is muffled inside the enclosure 100, the mating sound is difficult to hear for an operator who performs the task of mating the first electrical connector 10 and the second electrical connector 40 together. However, a sound path 30 conducting the mating sound to the outside of the enclosure 100 is provided in the first electrical connector 10 according to an exemplary embodiment, and therefore the mating sound is easy to hear for the operator.

Configurations of the first electrical connector 10 and the second electrical connector 40 will be described below, and thereafter the mating sound when the proper mating is made will be mentioned in addition to mating actions of the first electrical connector 10 and the second electrical connector 40.

The first electrical connector 10 is provided with a female first housing 11 formed of an electrically-insulating resin, and the male first terminals 25 formed of, for example a copper-based material, and having a high electrical conductivity, as shown in FIG. 1(*b*). The materials of the first housing 11 and the first terminals 25 apply to the second electrical connector 40.

In the first housing 11, the plurality of first terminals 25 are retained in a state of being arranged at a distance from one another, and a hood 13 is also formed to which the second electrical connector 40 is mated. The hood 13 is a rectangular tubular member, and a mating frontage 18 that is an opening thereof is provided. The hood 13 is also provided with a receiving region 19 for receiving the second electrical connector 40. In the present embodiment, the hood 13 is continuous in the width direction W, but may be divided into two or more by providing a partition wall.

Figure 2A:
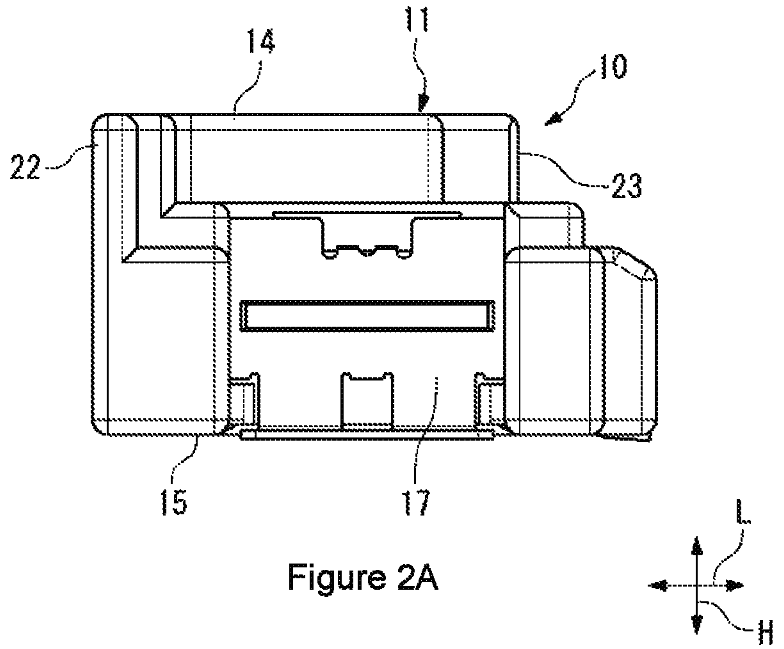
FIG. 2(*a*) is a side view of a first connector in accordance with an exemplary embodiment.
Figure 2B:
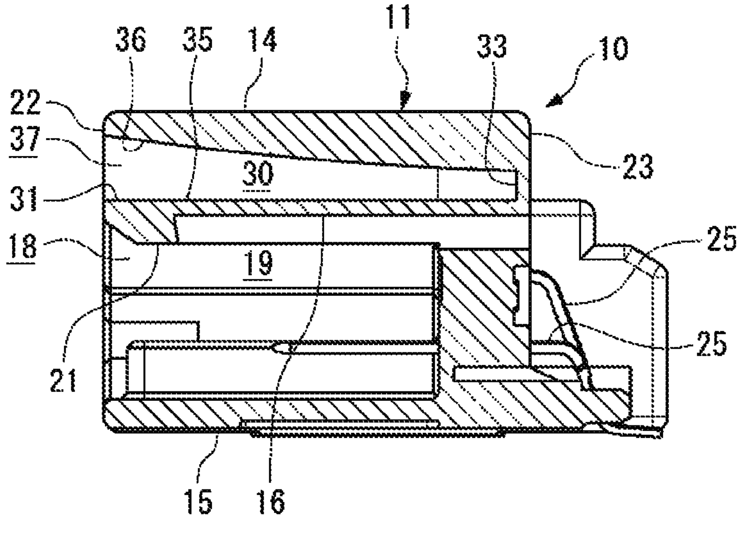
Figure 3A:
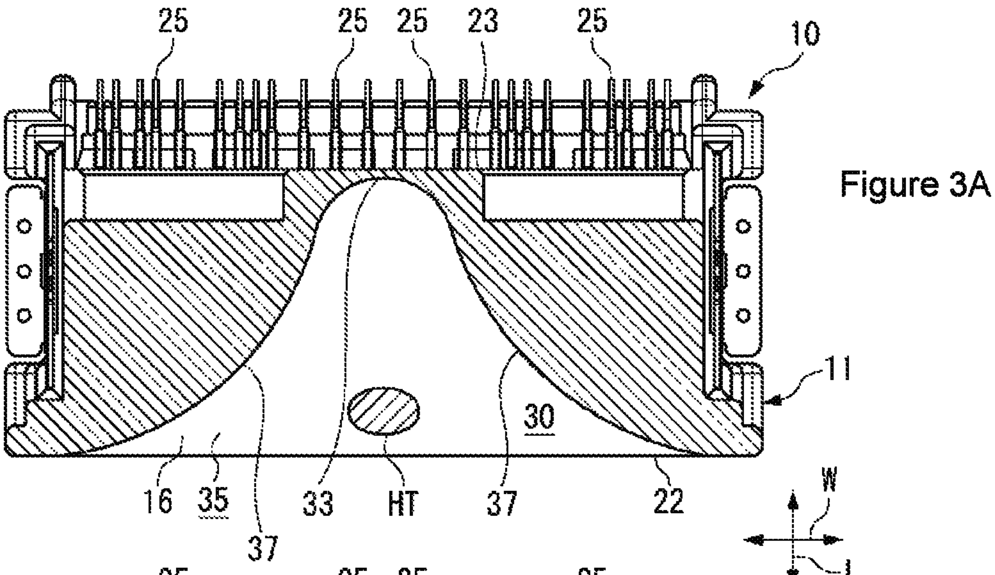
FIG. 3(*a*) is a cross sectional view of the first connector in accordance with an exemplary embodiment taken along a line IIIa-IIIa in the direction of arrows as shown in FIG. 3(*c*).
Figure 3B:
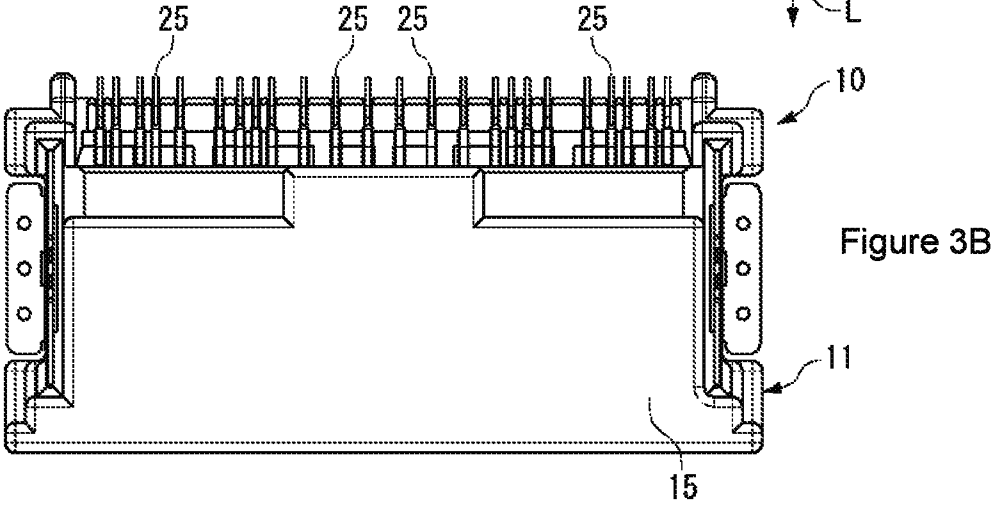
Figure 3C:
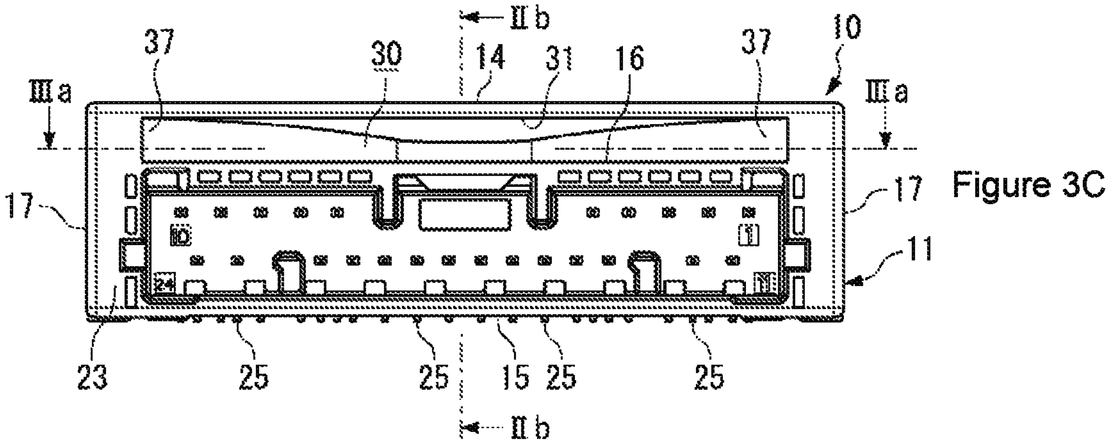

The first terminal 25 has a portion extending through the receiving region 19 that is electrically connected to the female terminal of the second electrical connector 40, and also has a portion led out from the rear of the hood 13 that is connected to a printed wiring board, as shown in FIGS. 2(*a*), 2(*b*) and FIGS. 3(*a*), 3(*b*). The first terminal 25 has the rearward led-out portion bent midway at about 90 degrees. The first terminals 25 are positioned in a plurality of columns in the width direction W, and also positioned in a plurality of rows, two rows in the present embodiment, in the height direction H.

The hood 13 is provided with an upper wall 14 and a lower wall 15 extending in the width direction W and opposite to each other at a predetermined distance from each other, as shown in FIG. 2(*b*), and a pair of sidewalls 17, 17 connecting both ends in the width direction W of the upper wall 14 and the lower wall 15 together in the height direction H.

The hood 13 is also provided with a partition wall 16 partitioning off a space between the upper wall 14 and the lower wall 15 in the height direction H, and the partition wall 16 connects the pair of sidewalls 17, 17 together in the width direction W. In the height direction H, the receiving region 19 mentioned above is provided below the partition wall 16, and the sound path 30 is provided adjacent to the receptable region 19 above the partition wall 16. That is, the sound path 30 and the receiving region 19 are divided from each other by the partition wall 16. The details of the sound path 30 will be described later.

In an exemplary embodiment, the first electrical connector 10 is mated with the second electrical connector 40 in a state of being mounted, for example, on a printed wiring board 200, as shown in FIGS. 6(*a*), 6(*b*), 6(*c*).

The hood 13 has a first lock protrusion 21 provided at a front end of and on a lower face of the partition wall 16, as shown in FIG. 2(*b*), on which is caught a second lock protrusion 54 of the lock arm 50 of the second electrical connector 40 described later. In the process of mating the second electrical connector 40 with the first electrical connector 10, the second lock protrusion 54 of the second electrical connector 40 climbs over the first lock protrusion 21 of the first electrical connector 10, and thereby the first electrical connector 10 and the second electrical connector 40 are prevented from unmating from each other, as shown in FIG. 6(*c*). It should be noted that in order to unlock the first lock protrusion 21 and the second lock protrusion 24, an operational end 53 of the lock arm 50 of the second electrical connector 40 is pressed downward in FIG. 4(*b*). In this state, the second electrical connector 40 is extracted from the first electrical connector 10, and thereby the first electrical connector 10 and the second electrical connector 40 can be unmated.

The hood 13 is provided with a front end side 22 and a rear end side 23 opposite to the front end side 22, as shown in FIGS. 2(*a*), 2(*b*). Mating of the first electrical connector 10 and the second electrical connector 40 is performed by inserting the second electrical connector 40 into the mating frontage 18 disposed in this front end side 22.

Next, the second electrical connector 40 will be described with reference to FIG. 1(*a*) and FIGS. 4(*a*), 4(*b*).

The second electrical connector 40 is provided with a second housing 41 and the female terminals, not shown, retained in the second housing 41. The second housing 41 retains a corresponding number of female second terminals in positions corresponding to the first terminals 25 retained in the first electrical connector 10.

The second housing 41 is provided with a second housing main body 43 retaining the second terminals, a front end wall 44(45) located at a front end of the second housing main body 43, a rear end wall 45(44) located at a rear end of the second housing main body 43, and the lock arm 50 preventing the second electrical connector 40 and the first electrical connector 10 from unmating from each other.

The second housing main body 43 has a plurality of terminal accommodating holes 46 formed along the width direction W and the height direction H, as shown in FIG. 1(*a*). The second terminal, not shown, is inserted into each terminal accommodating hole 46. The terminal accommodating holes 46 pass through from the front end wall 44 to the rear end wall 45.

When the second electrical connector 40 is mated with the first electrical connector 10, the rear end wall 45 protrudes more outward in the width direction W and the height direction H than the hood 13.

The lock arm 50 is provided at a middle portion in the width direction W in an upper portion of the second housing main body 43, as shown in FIG. 1(*a*). The lock arm 50 has a front end side forming a supported end 51 fixed to the second housing main body 43, and a rear end side forming the operational end 53, as shown in FIG. 4(*b*). The supported end 51 and the operational end 53 are connected by an elastic arm 52. The lock arm 50 is provided with the second lock protrusion 54 between the supported end 51 and the operational end 53, and this second lock protrusion 54 is mutually engaged with the first lock protrusion 21 formed on the hood 13, thereby preventing the first electrical connector 10 and the second electrical connector 40 from unmating from each other in the mated state of the first electrical connector 10 and the second electrical connector 40.

Figure 4A:
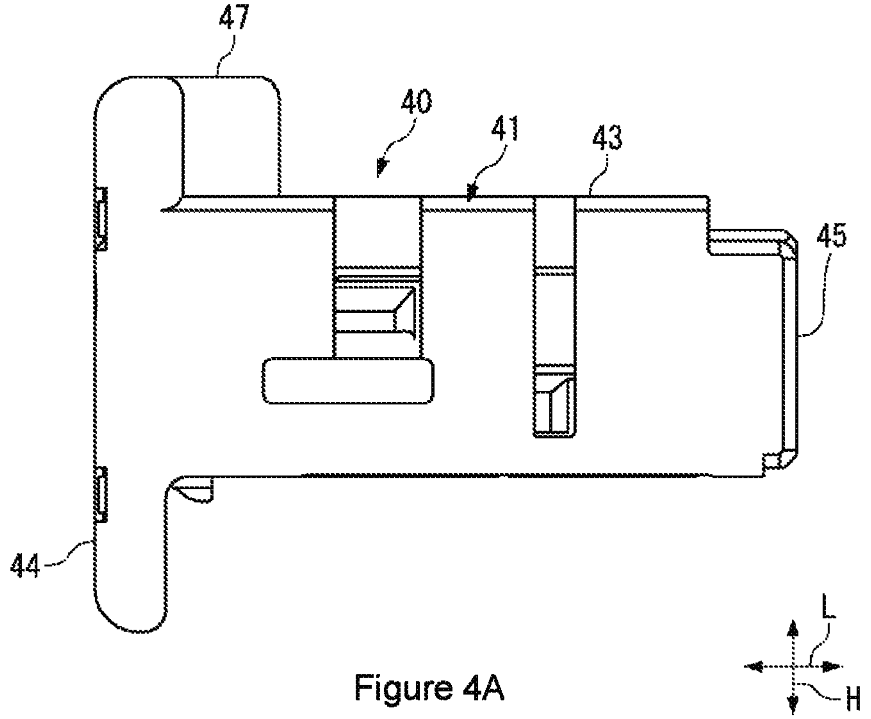
FIG. 4(*a*) is a side view of a second connector in accordance with an exemplary embodiment.
Figure 4B:
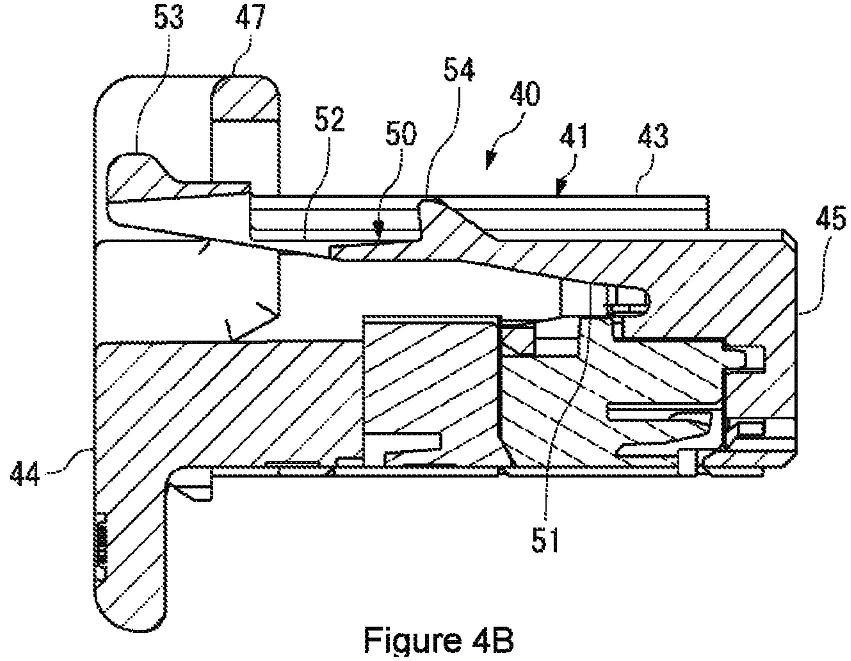

The second housing main body 43 is provided with a cover 47 covering the lock arm 50 from above, as shown in FIG. 4(*b*). A main object of the cover 47 is to prevent turning-up or misoperation of the lock arm 50.

The cover 47 is provided as a constitutional element of the rear end wall 45 by making a portion of the rear end wall 45 into a clearance passing through the front and rear thereof.

Below the cover 47 is the clearance, a front (sic rear) end portion of the lock arm 50 including the operational end 53 passes through this clearance and projects more rearward than the cover 47, and the lock arm 50 is made swingable on the supported end 51 within this clearance. The cover 47 has a thinner wall thickness in the longitudinal direction L than the remaining rear end wall 45, thereby ensuring access to the operational end 53 of the lock arm 50.

With reference to Figures FIG. 1(*b*), 2(*b*), FIGS. 3(*a*), 3(*c*), the electrical connector assembly 1 is provided with the sound path 30 in the first electrical connector 10. The sound path 30 can make it easy to hear the mating sound occurring when the second electrical connector 40 is mated with the first electrical connector 10. The sound path 30 will be described below with reference to FIG. 1(*b*), FIG. 2(*b*), and FIG. 3(*a*).

The sound path 30 is composed of a clearance provided between the upper wall 14 and the partition wall 16 of the first housing 11, as shown in FIGS. 1(*b*) and 2(*b*). The sound path 30 composed of this clearance is provided with an opened end 31 opened outside on the front end side 22, and a closed end 33 sealed by the first housing 11 so as not to be opened outside on the rear end side 23. The closed end 33 has an arc-like shape as viewed from above, as shown in FIG. 3(*a*). Since the sound path 30 is opened at a first end in the mating direction MD and sealed at a second end in the mating direction MD in this manner, the mating sound is conducted to the outside through the opened end 31 of the sound path 30.

Next, the clearance constituting the sound path 30 faces the partition wall 16, as shown in FIG. 2(*b*). As described later, when the first electrical connector 10 and the second electrical connector 40 are mated together, once the second lock protrusion 54 of the second electrical connector 40 climbs over the first lock protrusion 21 of the first electrical connector 10, the second lock protrusion 54 hits the partition wall 16. The sound path 30 is provided behind the partition wall 16 hit by the second lock protrusion 54, and, as viewed from above, includes a hitting region HT hit by the second lock protrusion 54.

Next, the sound path 30, as a preferred form, is so formed as to have an opening area increasing continuously from the rear end side 23 toward the front end side 22. This form is intended to increase a mating-sound emitting effect as the sound path 30, and imitates a so-called horn. As applied to a horn speaker, a horn is a mechanism that encloses an emitted sound to control its directivity, and concentrates the energy to give the sound a strong permeability. That is, when the second lock protrusion 54 hits the partition wall 16, air contained in the sound path 30 is given a velocity, and an acoustic wave is transmitted in almost the same phase on any plane parallel with the mating direction MD of the sound path 30 constituting the horn, and a sound is emitted at the opened end 31 in a state close to a plane wave. Therefore, the directivity is strong in a frequency range where the sound path 30 acts as a horn, and the efficiency increases accordingly.

The sound path 30 is provided with a lower face 35 that is an upper face of the partition wall 16, an upper face 36 opposite to the lower face 35, and a pair of sidewalls 37, 37 connecting the lower face 35 and the upper face 36 together on both sides in the width direction W, as shown in FIG. 2(*b*). A distance between the lower face 35 and the upper face 36 widens continuously from the rear end side 23 toward the front end side 22, as shown in FIG. 2(*b*), and a distance between the pair of sidewalls 37, 37 widens continuously, as shown in FIG. 3(*c*). That is, the sound path 30 of the present embodiment has a space widening continuously both in the width direction W and in the height directions H, and has an opening area increasing continuously from the closed end 33 toward the opened end 31.

Figure 5A:
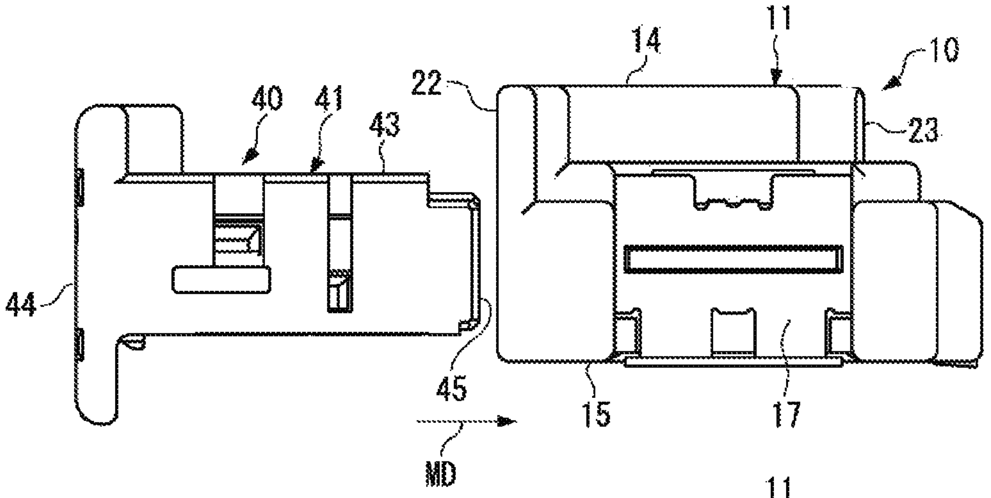
FIG. 5(*a*) is a side view of the electrical connector assembly in accordance with an exemplary embodiment at a first stage of mating.
Figure 5B:
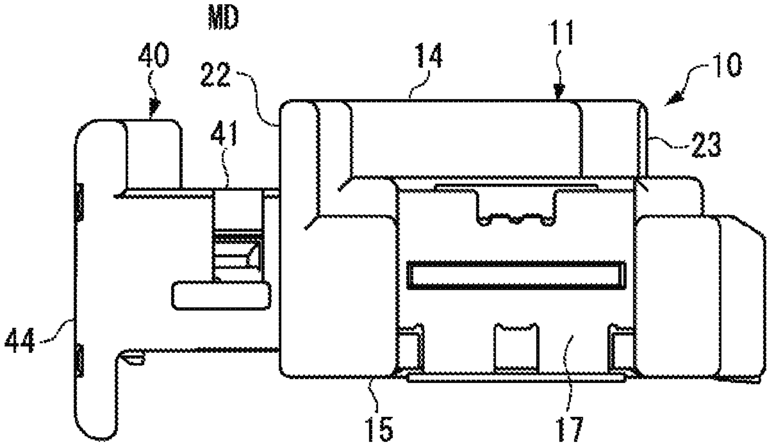
Figure 5C:
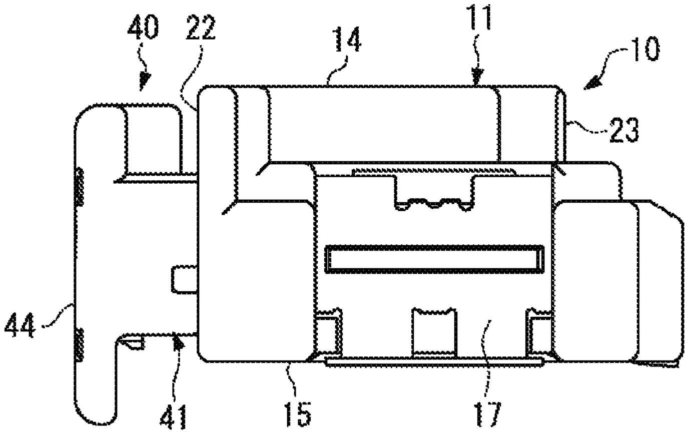

With reference to FIGS. 5 (*a*), 5(*b*), 5(*c*), FIGS. 6(*a*), 6(*b*), 6(*c*), mating actions of the first electrical connector 10 and the second electrical connector 40 will be described. This description will be made in the order of a first step of aligning the first electrical connector 10 and the second electrical connector 40 with each other, a second step of inserting the second electrical connector 40 into the receiving region 19 of the first electrical connector 10, and a third step of completing mating of the first electrical connector 10 and the second electrical connector 40 and achieving their proper mating.

It should be noted that, as shown in FIGS. 6(*a*), 6(*b*), 6(*c*), the first electrical connector 10 is accommodated in the enclosure 100, in a state of being mounted on the printed wiring board 200. It is provided, however, that a portion of the front of the first electrical connector 10 is exposed outside the enclosure 100. It should be noted that the enclosure 100 and the printed wiring board 200 are not shown in FIGS. 5(*a*), 5(*b*), 5(*c*).

In order to mate the first electrical connector 10 and the second electrical connector 40 together, the front side of the second electrical connector 40 is aligned with the mating frontage 18 continuous with the receiving region 19 of the first electrical connector 10, as shown in FIGS. 5(*a*) and 6(*a*). The alignment is performed in the width direction W and the height direction H.

After the alignment is completed, the second electrical connector 40 is pressed into the depth of the receiving region 19 of the first electrical connector 10. Thereupon, the second electrical connector 40 proceeds to a position where the second lock protrusion 54 of the second electrical connector 40 collides with the first lock protrusion 21 of the first electrical connector 10, as shown in FIG. 5(*b*), FIG. 6(*b*). Upon feeling this collision, an operator who performs the mating of the first electrical connector 10 and the second electrical connector 40 increases the force of pressing the second connector 40 thereinto. This is for the second lock protrusion 54 to climb over the first lock protrusion 21.

After the second lock protrusion 54 collides with the first lock protrusion 21, the second electrical connector 40 is further pressed thereinto. Thereupon, the elastic arm 52 of the lock arm 50 is deflected downward, the second lock protrusion 54 climbs over the first lock protrusion 21, and the second lock protrusion 54 and the first lock protrusion 21 reach an engaged state, so that the first electrical connector 10 and the second electrical connector 40 are prevented from unmating. Immediately after the second lock protrusion 54 climbs over the first lock protrusion 21, the second lock protrusion 54 hits the partition wall 16. This hit is based on an elastic energy by which the elastic arm 52 deflected downward returns to its original linear state, and causes the partition wall 16 to vibrate. A sound produced by this vibration is the mating sound indicating that the first electrical connector 10 and the second electrical connector 40 are properly mated together. Here, the fact that members involved in the prevention of unmating of the first electrical connector 10 and the second electrical connector 40, which are the second lock protrusion 54 and the first lock protrusion 21 in the present embodiment, are put into the engaged state means that the first electrical connector 10 and the second electrical connector 40 are properly mated together.

As described above, when the first electrical connector 10 and the second electrical connector 40 are properly mated together, the mating sound occurs due to hitting of the partition wall 16 by the second lock protrusion 54. The first electrical connector 10 is provided with the sound path 30 on the upper side of the partition wall 16. Therefore, the mating sound travels through the sound path 30 and is emitted outside from the opened end 31. Since the opened end 31 is positioned outside the enclosure 100, the mating sound is emitted from the opened end 31, so that it is unlikely that the operator will fail to hear the mating sound.

As described above, according to the electrical connector assembly 1, the sound path 30 is provided in the first electrical connector 10, and the sound path 30 has the opened end 31 thereof positioned outside the enclosure 100. Therefore, the mating sound is not muffled inside the enclosure 100, so that it is unlikely that an operator who performs the mating of the first electrical connector 10 and the second electrical connector 40 will fail to hear the mating sound emitted outside from the opened end 31.

Moreover, since the sound path 30 can be configured integrally with the first housing 11, the same task of mating the first electrical connector 10 and the second electrical connector 40 together as a conventional one will suffice, and in addition the manufacturing cost of the first electrical connector 10 is only slightly increased.

The sound path 30 according to the present embodiment has a horn shape. Therefore, the acoustic pressure of the mating sound emitted from the opened end 31 increases, so that it is more unlikely that an operator who performs the mating of the first electrical connector 10 and the second electrical connector 40 will fail to hear the mating sound emitted outside from the opened end 31.

Figure 7A:
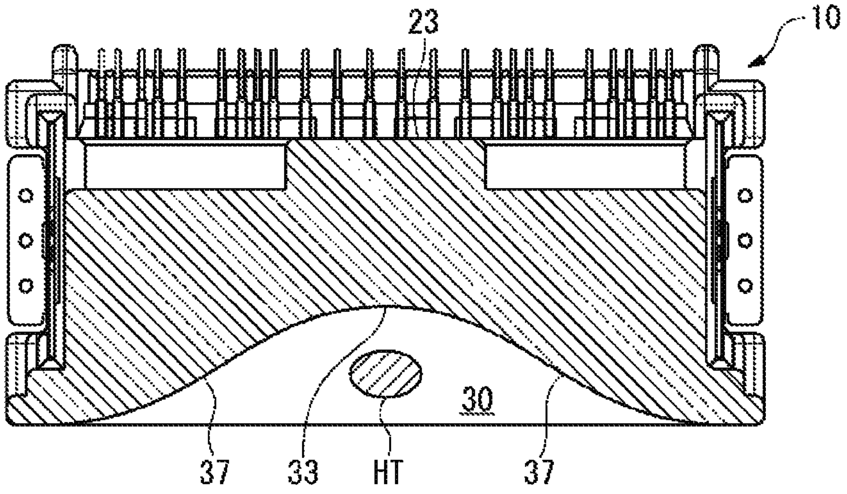
FIG. 7(*a*) is a diagram showing a modification of a sound path of the first connector in accordance with an exemplary embodiment, as viewed from above.
Figure 7B:
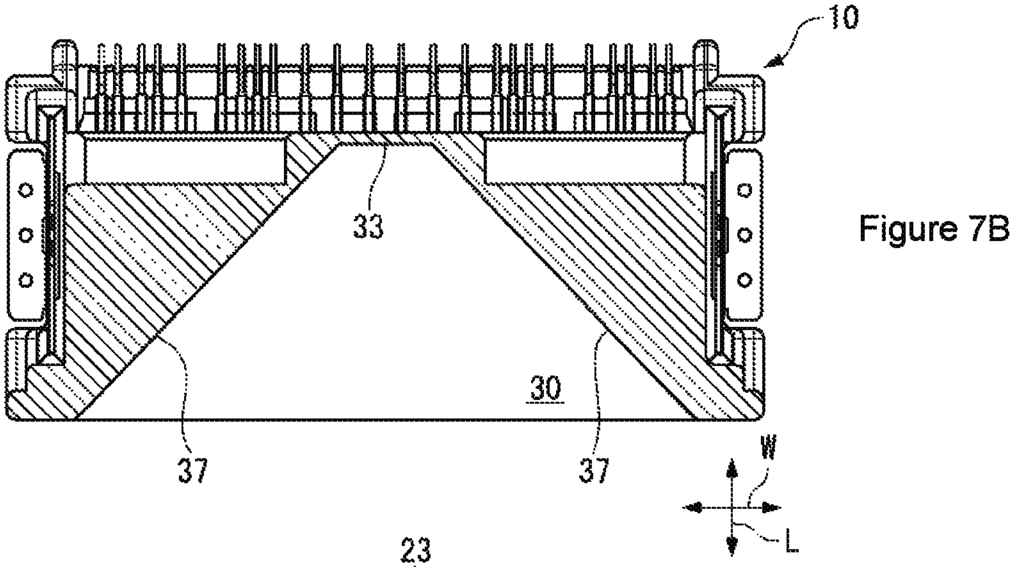
Figure 7C:
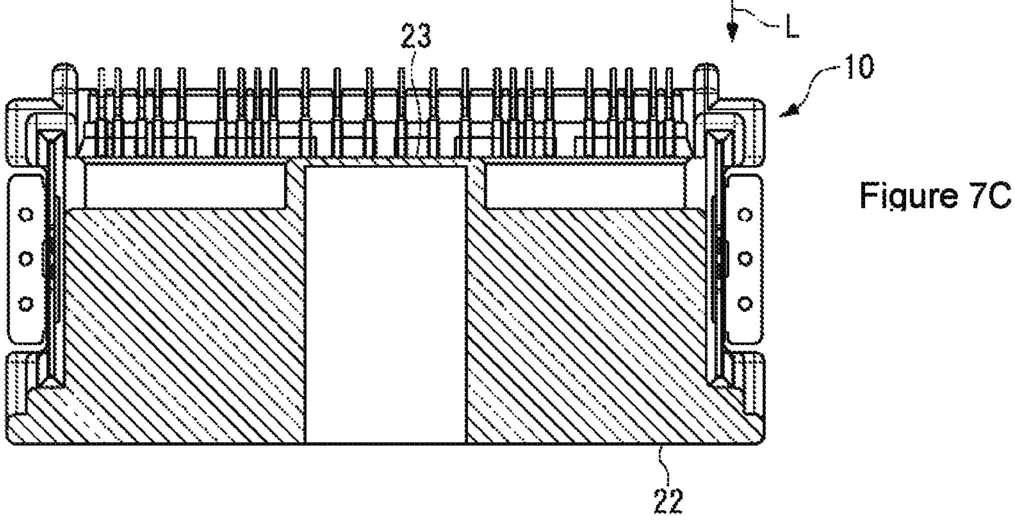

Modifications of the sound path 30 may be provided in alternative embodiments. A choice of which configuration to adopt may be made, or such a configuration may be appropriately changed to another configuration, without departing from the spirit of the disclosure. FIGS. 7(*a*), 7(*b*), 7(*c*) illustrate exemplary modifications of the sound path 30 as viewed from above.

The sound path 30 described above has the closed end 33 provided in a position near the rear end side 23, and enables the sound path 30 to fulfill its function even if the closed end 33 is closer to the opened end 31, as long as the sound path 30, as viewed from above, includes the hitting region HT where the second lock protrusion 54 hits the partition wall 16, as shown in FIG. 7(*a*).

Next, the sidewalls 37, 37 in the width direction W of the sound path 30 are curved, and the connector 10 allows them to be composed of a straight line, as shown in FIG. 7(*b*).

In addition, the sound path 30 has a dimension in the width direction W increasing from the rear end side 23 toward the front end side 22, but the dimension in the width direction W may also be equalized from the rear end side 23 toward the front end side 22, as shown in FIG. 7(*c*).

Figure 8:
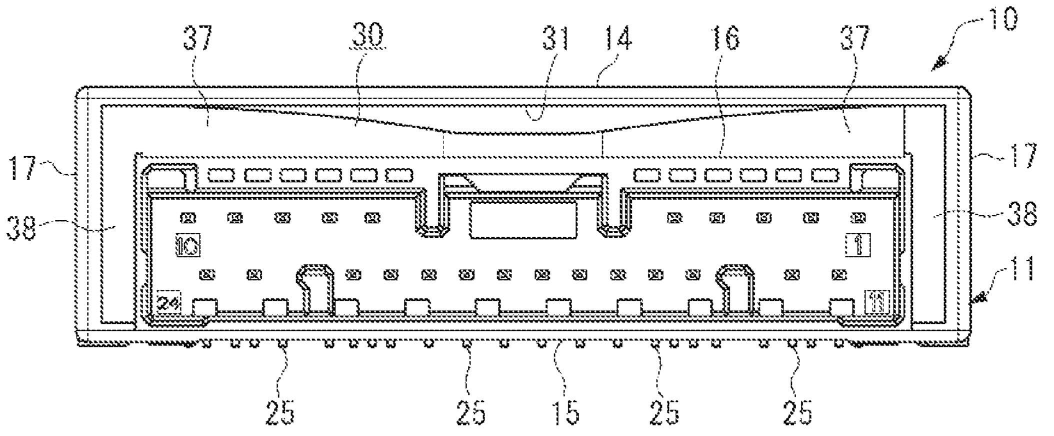
FIG. 8 is a diagram showing a modification of a sound path of the first connector in accordance with an exemplary embodiment, as viewed from front.

FIG. 8 shows a modification of the sound path 30 as viewed from front. Next, the sound path 30 is provided only on the side facing the partition wall 16 in the above embodiments, and the connector 10 allows the sound path 30 to be extendedly provided so as to be continuous with both sides in the width direction W of the receiving region 19, following the sidewalls 17, 17 of the first housing 11, as shown in FIG. 8.

It is provided hereinabove that the second lock protrusion 54 of the lock arm 50 hits the partition wall 16. In other various embodiments, the mating sound may be produced by hitting of the partition wall 16 by another element of the second electrical connector 40.

In addition, an example is shown hereinabove where the second lock protrusion 54 that is a hitting member is provided to the second electrical connector 40. In other various embodiments, a hitting member is provided to the first electrical connector 10, and an element corresponding to the sound path 30 to the second electrical connector 40.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:

a housing retaining a plurality of terminals, the housing being configured to be mated with a mating electrical connector along a mating direction, the housing comprises:

a receiving region configured to receive the mating electrical connector;

a sound path adjacent to the receiving region; and a partition wall dividing the receiving region and the sound path from each other;

wherein the sound path includes an open end on a first end and a closed end on a second end along the mating direction, the open end having a first area and the closed end having a second area, wherein the first area is larger than the second area;

wherein the open end is configured to face the mating electrical connector.

2. The electrical connector of claim 1, wherein the partition wall includes a hitting region configured to be hit by an element of the mating electrical connector according to proper mating with the mating electrical connector, and the sound path includes the hitting region, as viewed from above.

3. The electrical connector of claim 1, wherein the sound path has an opening area increasing from the second end toward the first end.

4. The electrical connector of claim 1, wherein the sound path is continuous with both sides in a width direction of the receiving region.

5. The electrical connector of claim 1, wherein the sound path has a horn shape.

6. The electrical connector of claim 1, wherein the first area is defined by a first width and a first height and the second area is defined by a second width and a second height, at least one of the first width and the first height being larger than the second width and the second height.

7. The electrical connector of claim 1, wherein the sound path includes a variable width between the first end and the second end.

8. The electrical connector of claim 1, wherein the sound path includes a variable height between the first end and the second end.

9. An electrical connector assembly comprising:

a mating electrical connector; and an electrical connector mutually mated with the mating electrical connector, the electrical connector comprising:

a housing retaining a plurality of terminals, the housing including a receiving region receiving the mating electrical connector, a sound path adjacent to the receiving region, and a partition wall dividing the receiving region and the sound path from each other;

wherein the sound path includes an open end on a first end and a closed end on a second end along the mating direction, the open end having a first area and the closed end having a second area, wherein the first area is larger than the second area;

wherein the open end is configured to face the mating electrical connector.

10. The electrical connector assembly of claim 9, wherein the partition wall includes a hitting region hit by an element of the mating electrical connector according to proper mating with the mating electrical connector, and the sound path includes the hitting region, as viewed from above.

11. The electrical connector assembly of claim 9, wherein the sound path has an opening area increasing from the second end toward the first end.

12. The electrical connector assembly of claim 9, wherein the sound path is continuous with both sides in a width direction of the receiving region.

13. The electrical connector assembly of claim 9, wherein the sound path has a horn shape.

14. The electrical connector assembly of claim 9, wherein the first area is defined by a first width and a first height and the second area is defined by a second width and a second height, at least one of the first width and the first height being larger than the second width and the second height.

15. The electrical connector assembly of claim 9, wherein the sound path includes at least one of a variable width and a variable height between the first end and the second end.

16. An electronic device comprising:

an electrical connector including a housing retaining a plurality of terminals, the housing configured to be mated with a mating electrical connector, the housing including a receiving region configured to receive the mating electrical connector, a sound path adjacent to the receiving region, and a partition wall dividing the receiving region and the sound path from each other, wherein the sound path includes an open end on a first end and a closed end on a second end along the mating direction, the open end having a first area and the closed end having a second area, wherein the first area is larger than the second area; and an enclosure configured to accommodate the electrical connector with a mating frontage of the electrical connector exposed outside;

wherein the open end is exposed outside together with the mating frontage.

17. The electronic device of claim 16, wherein the partition wall includes a hitting region configured to be hit by an element of the mating electrical connector according to proper mating with the mating electrical connector, and the sound path includes the hitting region, as viewed from above.

18. The electronic device of claim 16, wherein the sound path has an opening area increasing from the second end toward the first end.

19. The electronic device of claim 16, wherein the sound path is continuous with both sides in a width direction of the receiving region.

20. The electronic device of claim 16, wherein the sound path has a horn shape.

* * * * *